J. CZECHOWICZ.
CARPET SWEEPER.
APPLICATION FILED JUNE 18, 1919.
1,332,429.
Patented Mar. 2, 1920.
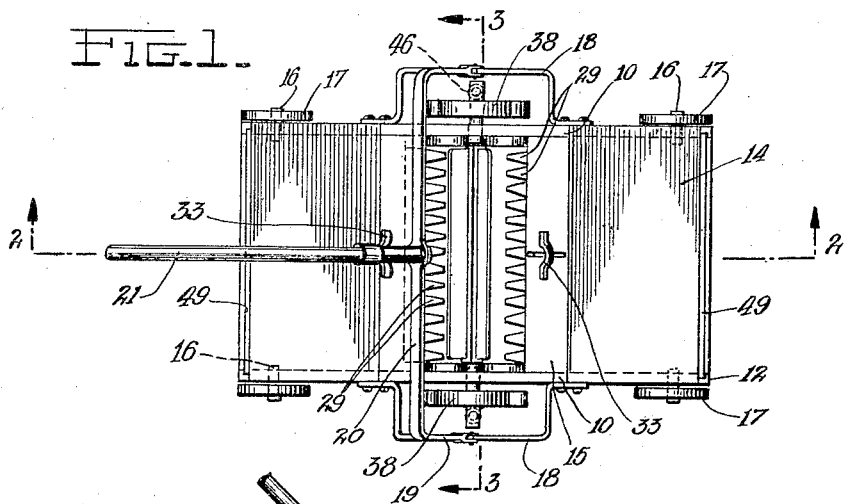
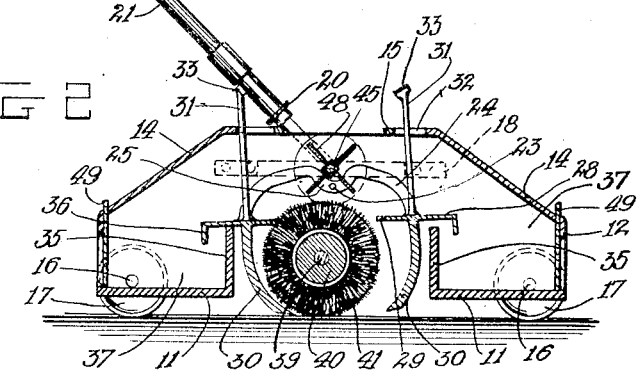
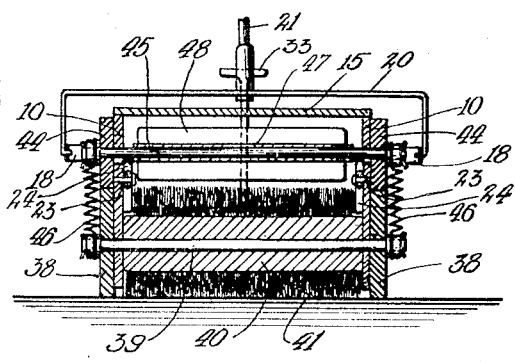
Inventor
Jacob Czechowicz
By his Attorney Adam E. Schatz

UNITED STATES PATENT OFFICE.

JACOB CZECHOWICZ, OF TERRE HAUTE, INDIANA, ASSIGNOR OF ONE-HALF TO STANLEY MACIEJEWSKI, OF CLINTON, INDIANA.

CARPET-SWEEPER.

1,332,429.  Specification of Letters Patent.  Patented Mar. 2, 1920.

Application filed June 12, 1919. Serial No. 305,064.

*To all whom it may concern:*

Be it known that I, JACOB CZECHOWICZ, a citizen of Poland, residing at Terre Haute, county of Vigo, and State of Indiana, have invented certain new and useful Improvements in Carpet-Sweepers, of which the following is a specification.

This invention relates to improvements in carpet sweepers and has as one of its objects the provision of means whereby the sweepings and accumulations gathered by the brush are removed and deposited within the sweeper casing.

A further object is to provide a blast of air which assists materially in releasing the sweepings from the fibers of the brush, and finally, to provide means whereby the same effect is obtained when operating the implement in reverse directions.

These and other like objects are attained by the novel construction and combination of parts hereinafter described and shown in the accompanying drawings, forming a material part of this disclosure, and in which:—

Figure 1 is a top plan view showing a carpet sweeper made in accordance with the invention.

Fig. 2 is a longitudinal vertical sectional view taken on line 2—2 of Fig. 1, and Fig. 3 is a transverse sectional view taken on line 3—3 of Fig. 1.

Referring to the drawings, the apparatus is shown to be comprised of a substantially rectangular casing, having side walls 10, and partial floorings 11, extending uniformly in from the ends 12, and obliquely disposed cover plates 14, joined at their inner edges by a flat plate 15.

Journaled upon pins 16, extending outward from the side plate 10, are wheels 17, the same being so arranged as to support the apparatus above the floor as can best be seen in Fig. 2.

Secured on the outer sides of the walls 10 are outwardly extending brackets 18, and pivotally connected to the center of these brackets are parallel arms 19, formed with a bar 20, constituting a bail-like element in which is engaged the handle 21, by which the apparatus is manipulated.

Also pivoted to the side walls 10, by pins 23, are a pair of arcuate elements 24, having central depressed portions 25, the outturned ends of the arcuate elements being rigidly engaged upon the upper surface of a pair of opposed horizontal leaves 28, extending transversely across the entire apparatus and provided at their front edges with serrations or teeth 29, the same extending toward each other at about the center of the casing.

Extending angularly downward from the leaves 28 are vertical walls 30, the lower edges being adapted to make contact with the surface over which the rollers or wheels 17 operate, and either of which may be depressed according to the position which the operative handle 31 assumes, it being understood that the leaves 28, arcuate elements 24 and walls 30 all move upon the axis 23.

Extending up from the leaves 28, at the center thereof, are rods 31, the same passing through openings 32, formed in the cover plates 15, the rods having enlarged heads 33, with concave surfaces upon which the handle 31 is adapted to rest when in either of its angular positions, the movement of the leaves 28 being limited by contact with the inner surfaces of the partition plate 35, upon which the toothed elements rest at the extremity of their inclination.

These leaves are provided with the downwardly extending edges 36, preventing the sweepings from moving outwardly from the chambers 37 formed in each end of the casing.

The outwardly extending brackets 18 also act as guards for friction wheels 38, mounted upon the ends of a shaft 39, held in appropriate openings formed in the side walls 10, between which is secured a roller 40 on the shaft, the roller acting as a backing or center of the brush 41 which is adapted to make contact with the surface over which the apparatus is pushed. The wheels 38 are preferably covered with rubber or other pliable material, as are also the support wheels 17 so as to prevent damage to furniture and other articles with which they may come in contact during operation of the apparatus.

Another pair of friction wheels 44 making contact with the wheels 38 are mounted on a shaft 45, and are drawn downward into contact by means of coiled tension springs 46, the same being attached at the respective ends of the shafts 39 and 45, the latter shaft having fixed upon it a sleeve 47, with which is engaged a plurality of plates or vanes 48, the arrangement being such that the same are rotated and cause a current of air to be set up within the casing materially assisting in cleaning the bristles of the revolving brush from adhering particles as the brush comes in contact with the teeth 29.

The chambers 37 may be emptied of their accumulations by raising either of the shutter plates 49, slidable vertically closely adjacent to the end walls 12, and forming a barrier during the operation of the apparatus.

From the foregoing it will be seen that a novel and practical implement has been disclosed, which is operated by the usual means, the revolving brush 41, removing any accumulation from the surface, which due to the action of the brush and plates 30, is brought over the top of the brush and, coming in contact with teeth is deposited upon the face of the leaves 28, and are moved therefrom by the air from the vanes 48 down the inclined surface into their respective chambers, the same acting uniformly in whichever direction the implement is moved.

Having thus described my invention, and set forth the manner of its construction, application and use what I claim as new and desire to secure by Letters Patent, is:—

1. In a sweeper, the combination with a wheeled casing, and a brush rotatably mounted in said casing, said brush being adapted to make contact with the surface over which the implement is moved, of a frame pivotally mounted in the side walls of said casing, teeth formed in the front of said frame adapted to engage with said brush in whichever direction it is propelled, a handle pivotally engaged with said casing, and means operated by said handle for swinging said frame according to the direction in which the implement is moved.

2. In a carpet sweeper, the combination with a casing mounted upon wheels, and a brush rotatably mounted therein, of a frame pivoted on an axis above said brush, said frame having leaves in the upper portion of said casings, plates extending downwardly from said leaves adapted to contact with the surface being cleaned, bars extending upward from said frame, a handle pivotally engaged near the center of said casing adapted to rest on either of said bars, and means for limiting the pivotal-movement of said frame, said means also acting to support said handle when in an angular position.

3. In a carpet sweeper, the combination with a hollow casing supported by wheels at the corners, and a brush rotatably mounted therein, of a frame pivoted centrally in said casing above the axis of said brush, said frame having angular vertical elements, teeth formed with the inner edges of said frame adapted to engage with the bristles of said brush, support rods extending upward from said frame, a handle pivotally mounted exteriorly of said casing adapted to rest upon said rods in an inclined position, friction wheels mounted upon the shaft carrying said brush, a second pair of friction wheels on said casing adapted to make contact with the first named friction wheels, and a fan operated by said second pair of wheels, whereby a blast of air may be delivered upon the upper surface of said brush.

In testimony whereof I have affixed my signature.

JACOB CZECHOWICZ.